United States Patent
Dutton et al.

(10) Patent No.: US 6,959,345 B1
(45) Date of Patent: Oct. 25, 2005

(54) METHOD AND SYSTEM FOR CALIBRATING SCSI EXPANDERS

(75) Inventors: Fredarico E. Dutton, Garden Grove, CA (US); Ting Li Chan, Laguna Niguel, CA (US)

(73) Assignee: Qlogic Corporation, Aliso Viejo, CA (US)

( * ) Notice: Subject to any disclaimer, the term of this patent is extended or adjusted under 35 U.S.C. 154(b) by 373 days.

(21) Appl. No.: 10/410,773

(22) Filed: Apr. 10, 2003

(51) Int. Cl.[7] .......................... G06F 3/00; G06F 13/42; G06F 13/00

(52) U.S. Cl. .............................. 710/19; 710/8; 710/10; 710/15; 710/18; 710/300; 710/105; 710/106

(58) Field of Search .............................. 710/5, 6, 8, 10, 710/15, 18, 19, 58, 60, 61, 300, 104, 105, 710/106

(56) References Cited

U.S. PATENT DOCUMENTS

| | | | | |
|---|---|---|---|---|
| 6,754,720 B1 * | 6/2004 | Packer | ........................... | 710/8 |
| 6,804,739 B1 * | 10/2004 | Young et al. | ................ | 710/300 |
| 2003/0196149 A1 * | 10/2003 | Gygi et al. | .................. | 714/719 |
| 2004/0030964 A1 * | 2/2004 | Slutz et al. | ................. | 714/700 |
| 2004/0153891 A1 * | 8/2004 | Slutz et al. | ................. | 714/699 |

* cited by examiner

*Primary Examiner*—Jeffrey Green
*Assistant Examiner*—Joshua D Schneider
(74) *Attorney, Agent, or Firm*—Tejinder Singh, Klein, O'Neill & Singh, LLP

(57) ABSTRACT

An expander coupled between at least a first and second SCSI device for transmitting data and training patterns is provided. The expander includes, a first detection module for detecting a training pattern received from the first device; a second detection module that detects when a first section of the training pattern has been transmitted to the second device; and means for changing the expander's mode from a training mode to a repeat mode after the first section.

9 Claims, 4 Drawing Sheets

METHOD AND SYSTEM FOR CALIBRATING SCSI EXPANDERS

BACKGROUND

1. Field of the Invention

The present invention relates to storage systems, and more particularly to expanders used for communication between SCSI devices.

2. Background of the Invention

Small Computer Systems Interface ("SCSI") is commonly used to transfer information between a host computer system and a storage device (for example, a SCSI device). SCSI is an industry standard that defines a system level bus with intelligent controllers on each device to manage flow of information.

In a typical SCSI exchange, an initiator sends a "read" or "write" command to a target. For a read operation, the target sends the requested data to the initiator. For a write command, the target sends a "Ready to Transfer" response informing the initiator that the target is ready to accept the write data. The initiator then sends the write data to the target. Once the data is transferred, the exchange enters the response phase. The target then sends a response to the initiator with the status of the operation. Once the initiator receives this response, the exchange is complete.

Various standards are used to facilitate SCSI data transfers and communication. The standards define protocols, signal schemes, and cabling requirements. One such standard is the SCSI parallel interface, also referred to as the "SPI-4" standard, developed as an American National standards institute ("ANSI"), and incorporated herein by reference in its entirety. SPI-4 uses double transition clocking at 80 Mhz which results in a maximum theoretical throughput of 320 Megabytes/second ("MB/s") on a wide SCSI bus.

"Paced transfer" is used to accomplish 320 MB/S transfer on a 16-bit parallel bus at 80 MHz. This requires transfer of data using dual 80 MHz clocks with each clock transferring two bytes of information. The standard signals used to transfer the data are defined as "REQ" and "ACK". REQ is a data clock signal from a target to initiator and ACK is a data clock signal from initiator to target.

Before SCSI devices can communicate using paced transfer, a receiver function, which includes receiver skew compensation, clock shifting and receiver signal adjustment must be calibrated. This is accomplished by using a pre-defined calibration (also referred to as training) pattern that is transmitted from the sending device (initiator or target) to the receiving device. FIGS. 3–4 show timing diagrams of data sent from a target device to an initiator and vice versa. Training signal is divided into three parts per the SPI-4 standard, namely Section A 303, Section B 305 and Section C 306 with a typical 50 nanosecond (ns) 304 delay between Section B 305 and Section A 303.

A SCSI expander is typically used to isolate, convert and expand the SCSI domain. An expander can isolate different SCSI domains allowing two or more devices to exist in electrically isolated domains. An expander can act as a converter allowing a single-ended device to connect to a low-voltage differential device. The expander may also be used to extend cable length by re-timing SCSI signals.

SCSI expanders may use precision delay cells ("PDC") to implement the foregoing data-paths. The expander receives all signals transmitted by a source device initiator or target, re-times the signal for optimal set-up and "repeats" the received signals.

FIG. 5 shows the training functionality of an expander 503 with respect to initiator 505 and target 501. During transmission of a paced training pattern, an expander must train its receiver function and train the device downstream. The expander simply cannot "repeat" the training pattern it receives from a source device. The expander has to calibrate its own receiver function and at the same time train the device downstream.

Frequently data must be sent right after the training pattern. There is no time window to switch from the training mode to repeat mode (i.e., when data is transmitted). This problem gets worse if there are more than one SCSI device involved. This causes delay and latency, which is not commercially desirable in expanders.

Therefore, what is required is a process and system that will allow a simple, PDC expander to train receivers and transfer data efficiently.

SUMMARY OF THE INVENTION

In one aspect of the present invention, an expander coupled between at least a first and second SCSI device for transmitting data and training patterns is provided. The expander includes a first detection module for detecting a training pattern received from a first device and a second detection module that detects when a first section of the training pattern has been transmitted to a second device. The expander also includes the means for changing the expander's mode from a training mode to a repeat mode after the first section. The change from the training mode to the repeat mode occurs during a delay after the first section has been transmitted.

In another aspect of the present invention, a method for transmitting a training pattern to an expander coupled between at least a first and second SCSI device is provided. The method includes detecting an end of transmission of a first section of the training pattern from the expander to the second device; and switching from a training mode to repeat mode for transmitting a second section of the training pattern after detecting the end of transmission by the first device of the first section of the training pattern. The switching from training mode to repeat mode occurs during a delay following the transmission of the first section.

In another aspect of the present invention, because transmission mode changes before the end of a training pattern, there is no latency or delay in transmitting data that follows the training pattern.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a SCSI system will be described. The specific architecture and operation of the preferred embodiments will then be described with reference to the general architecture of the network system.

Figure 1:
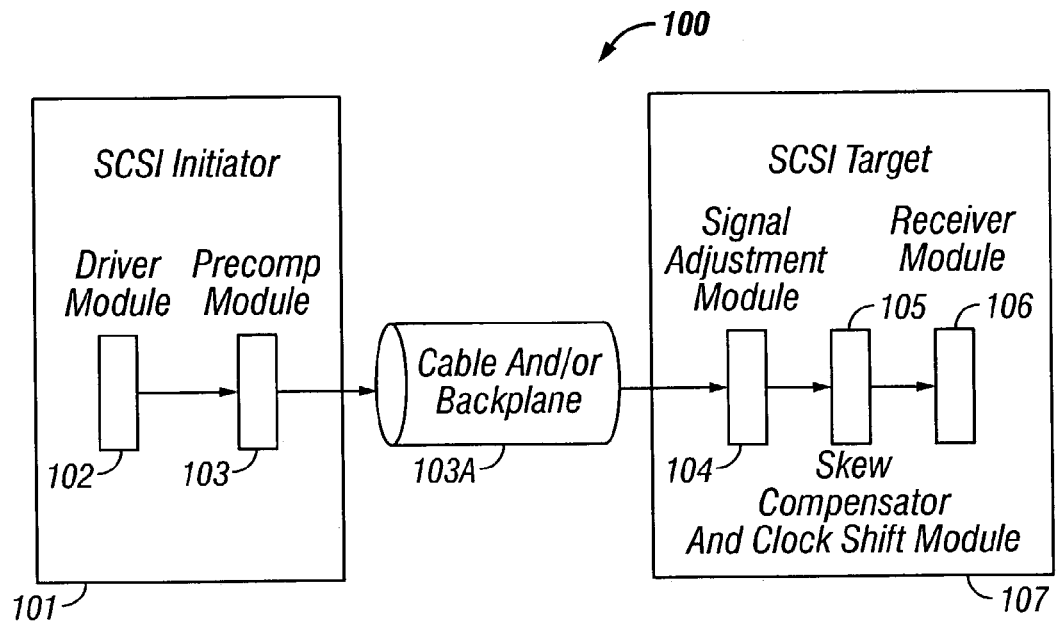
FIG. 1 is a block diagram showing a SCSI Initiator and Target coupled by a cable.

FIG. 1 shows a block diagram with SCSI devices used for a paced transfer. Initiator 101 (this could be a host computer system) sends data to target 107 (this may be any SCSI storage device) via a cable 103A. Initiator 101 includes a driver 102 and driver pre-compensation module 103. Target 107 includes a signal adjustment module 104 and a skew compensator/clock shift module (also referred to as "skew module") 105.

Skew module 105 adjusts the timing relationship between data clocking signals (REQ or ACK) and the data bus signals. The adjustment causes the clock signal to align with the middle of the clocked signals when they enter receiver 106 and allows receiver 106 to use the clock to latch valid data.

Figure 2:
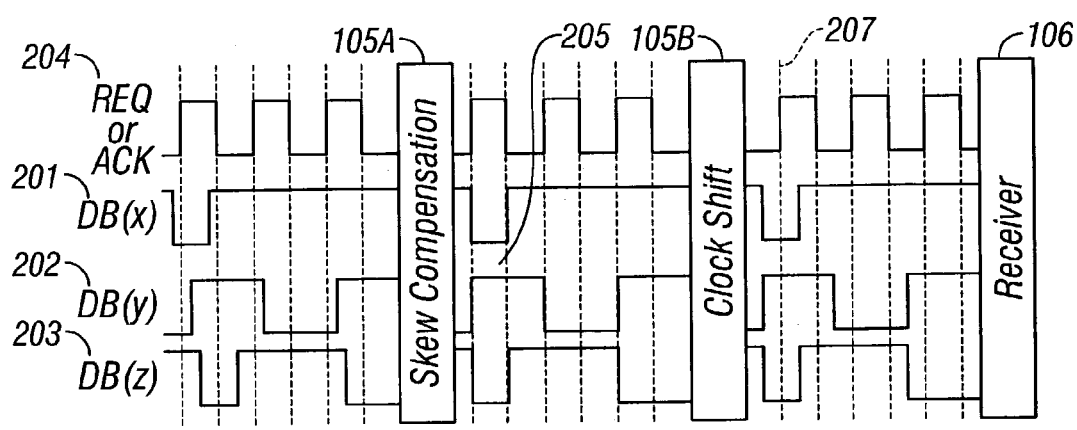
FIG. 2 is a timing diagram showing skew compensation.

FIG. 2 shows an example of skew compensation and clock shifting. Skew module 105 is shown as a skew compensation module 105A and clock shift module 105B for illustration purposes. Clock signal 204 (REQ or ACK) is compared with data bit signals 201–203. The signals are de-skewed at 205 and the clock shift is shown as 207.

Figure 6:
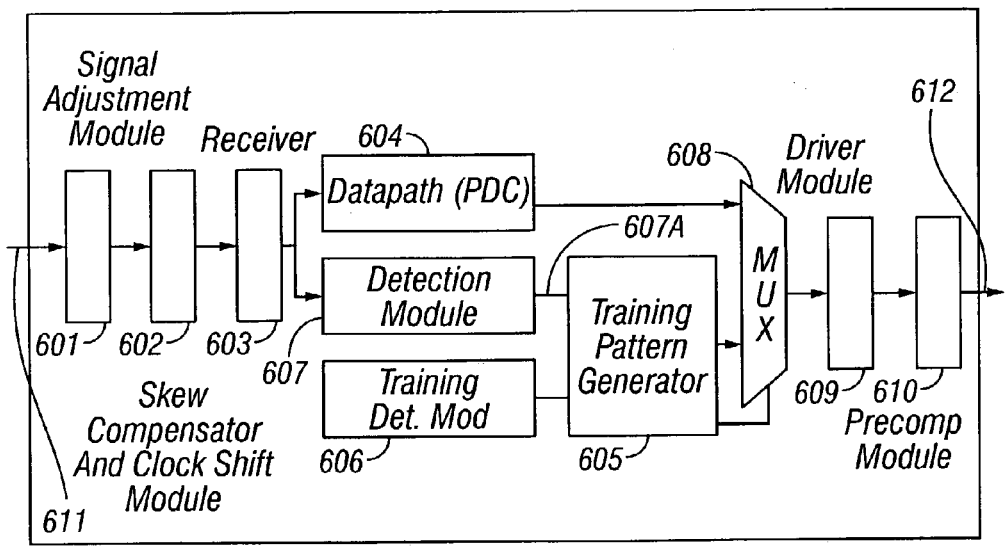
FIG. 6 is a block diagram showing an expander, according to one aspect of the present invention.

FIG. 6 shows a block diagram for expander 600, according to one aspect of the present invention. Expander 600 receives signal 611 from a SCSI device (initiator or target). Signal 611 is adjusted by signal adjustment module 601. It is noteworthy that module 601 is optional. Signal 611 is compensated by skew module 602 and sent to receiver 603.

Training pattern detection module 606 detects if a training pattern is being sent from a SCSI device. Training pattern generator 605 then generates the training pattern Section A (303 or 407) that is then sent out via multiplexor 608 as signal 612.

Figure 3:
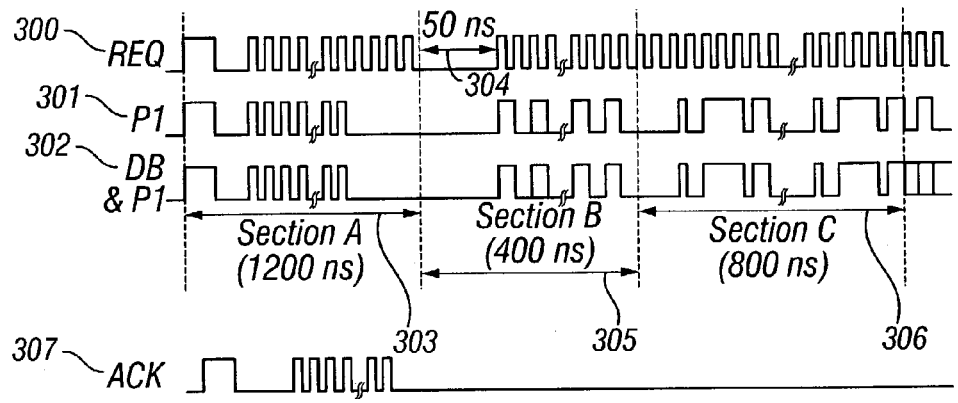
FIGS. 3–4 show timing diagrams for training pattern when data is written or read out from a SCSI device.
Figure 4:
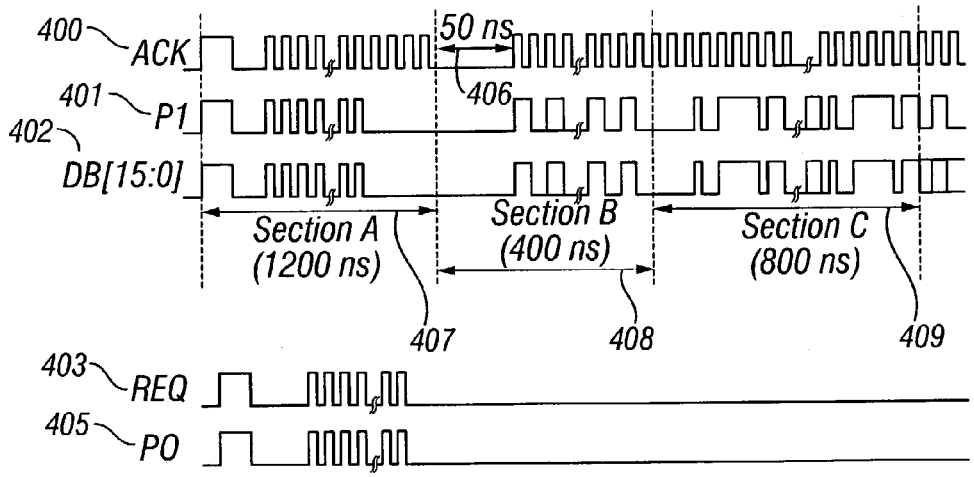
Figure 5:
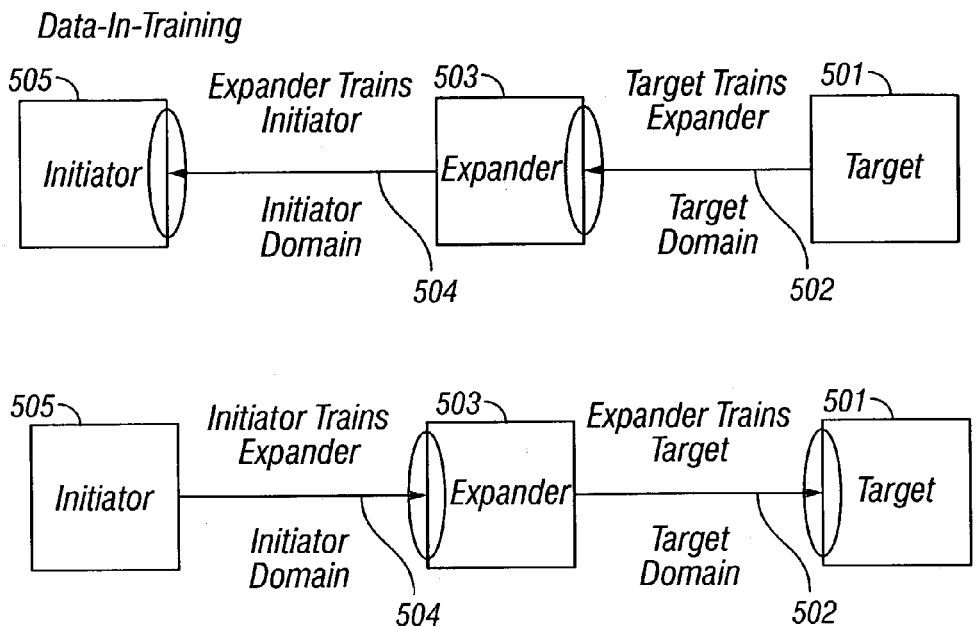
FIG. 5 is a block diagram showing training sequences between an initiator and target device.

Detection module 607 detects when Section A pattern has been transmitted and when the 50 ns time delay (304, FIG. 3 and 406, FIG. 4) starts. Thereafter, detection module 607 sends signal 607A to multiplexor 608 which indicates that Section A (303 or 407) has been transmitted by Expander 600. Based on signal 607A, multiplexor 608 changes the training mode to normal "repeat" mode. This allows Section B (305 or 408) and Section C (306 or 409) to be sent in normal data mode. Once training is over, expander 600 is already in repeat mode and hence there is no delay in transmitting any data that follows the training pattern.

In one aspect of the present invention, delay (304 or 406) is used to change the mode from training to repeat, so that there is no delay in transmitting any data that follows the training pattern.

Figure 7:
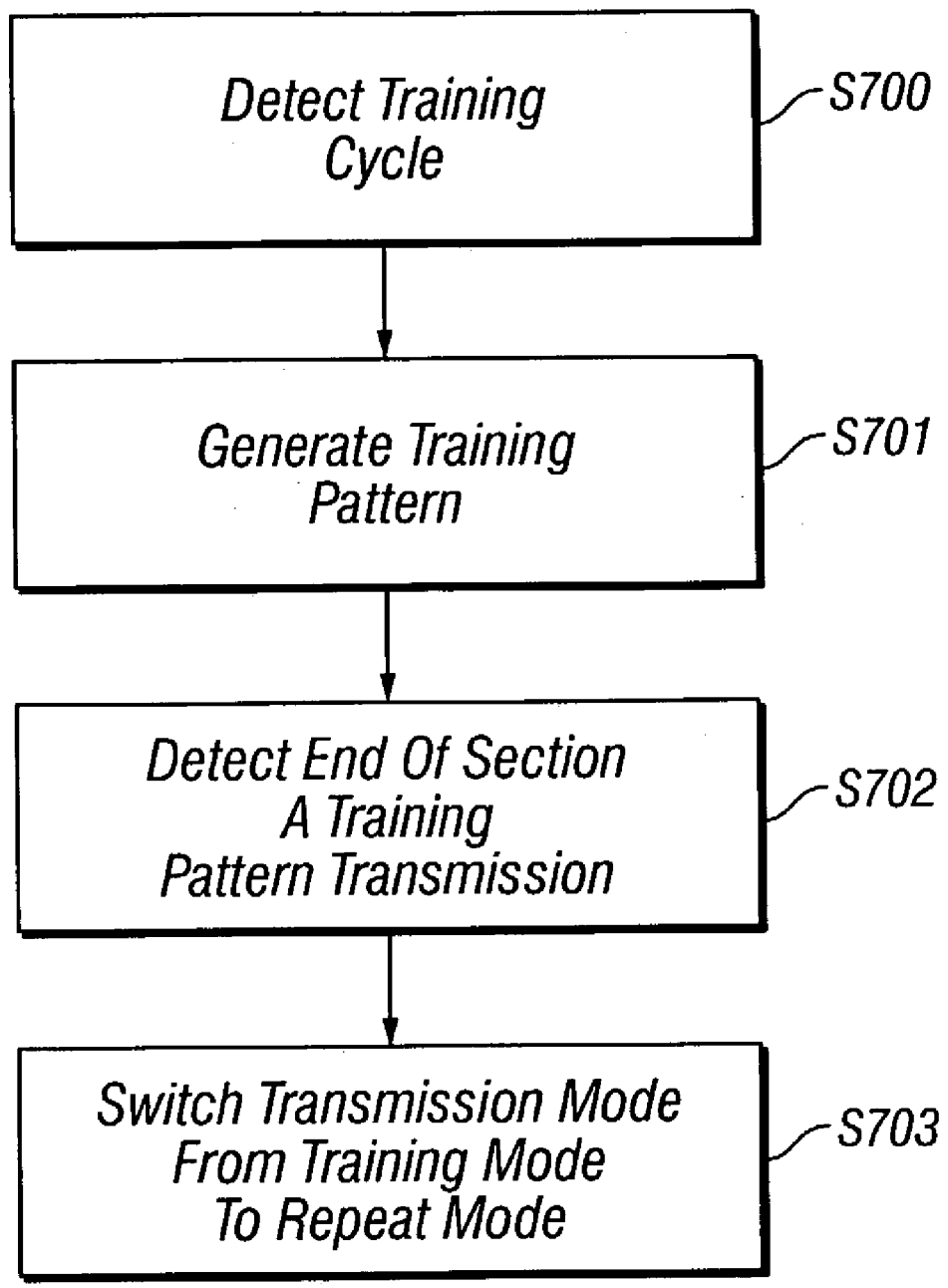
FIG. 7 is a flow diagram of process steps used by a SCSI expander, according to one aspect of the present invention.

FIG. 7 shows a flow diagram of process steps for calibrating an expander, according to one aspect of the present invention.

In step S700, expander detection module 606 detects a training pattern.

In step S701, training pattern generator 605 generates and transmits training pattern Section A (303 or 407) to a device downstream.

In step S702, module 607 detects the end of Section A (303 or 407) transmission and the beginning of delay 304 or 406.

In step S703, module 607 sends a signal to training pattern generator 605 indicating the end of Section A (303 or 407) transmission. This switches the transmission mode for Section B (305 or 408) and Section C (306 or 409) from a training mode to repeat mode. Hence after Section C (306 or 409), if there is any data for transmission, there will be no delay or latency.

In one aspect of the present invention, because transmission mode changes before the end of a training pattern, there is no latency or delay in transmitting data that follows the training pattern.

Although the present invention has been described with reference to specific embodiments, these embodiments are illustrative only and not limiting. Many other applications and embodiments of the present invention will be apparent in light of this disclosure and the following claims.

What is claimed is:

1. A method for transmitting a training pattern to an expander coupled between at least a first and second SCSI device, comprising:

detecting an end of transmission of a first section of the training pattern from the expander to the second device; and switching from a training mode to repeat mode for transmitting a second section of the training pattern after detecting the end of transmission of the first section of the training pattern.

2. The method of claim 1, wherein in the first section of the training pattern is Section A of the training pattern.

3. The method of claim 2, wherein the switching from training to repeat mode occurs during a delay following the Section A transmission.

4. An expander coupled between at least a first and a second SCSI device for transmitting data and training patterns, comprising:

a first detection module for detecting a training pattern received from the first device;

a second detection module that detects when a first section of the training pattern has been transmitted by the first device; and means for changing the expander's mode from a training mode to a repeat mode after the first section of the training pattern has been transmitted to the second device.

5. The expander of claim 4, wherein the change from the training mode to the repeat mode occurs during a delay after the first section has been transmitted.

6. A system for transmitting training patterns between at least a first and second SCSI device, comprising:

an expander coupled between the first and second SCSI device comprising:

a first detection module that detects when a training pattern has been received from the first device;

a second detection module that detects when a first section of the training pattern has been transmitted to the second device; and means for changing the expander's mode from a training mode to a repeat mode after the first section of the training pattern has been transmitted to the second device.

7. The system of claim 6, wherein the change from the training mode to the repeat mode occurs during a delay after the first section has been transmitted.

8. An expander coupled between at least a first and a second SCSI device for transmitting data and training patterns, comprising:

means for detecting training pattern received from the first device;

means for detecting when a first section of the training pattern has been transmitted by the first device; and means for changing the expander's mode from a training mode to a repeat mode after the first section of the training pattern has been transmitted to the second device.

9. The expander of claim 8, wherein the change from the training mode to the repeat mode occurs during a delay after the first section has been transmitted.

\* \* \* \* \*